United States Patent
Diamantidis et al.

(10) Patent No.: US 7,463,432 B2
(45) Date of Patent: Dec. 9, 2008

(54) OBJECTIVE OPERATING IN THE INFRARED

(75) Inventors: Georg Diamantidis, Dernbach (DE); Zhao Guozhong, Shanghai (CN)

(73) Assignee: Noctron Holding S.A., Luxembourg (LU)

( * ) Notice: Subject to any disclaimer, the term of this patent is extended or adjusted under 35 U.S.C. 154(b) by 114 days.

(21) Appl. No.: 11/542,815

(22) Filed: Oct. 3, 2006

(65) Prior Publication Data
US 2007/0076307 A1 Apr. 5, 2007

(30) Foreign Application Priority Data
Oct. 4, 2005 (DE) .................. 10 2005 047 488

(51) Int. Cl.
G02B 27/00 (2006.01)
G06K 7/00 (2006.01)

(52) U.S. Cl. .................. 359/754; 359/793; 359/350

(58) Field of Classification Search ......... 359/754–795, 359/350–357
See application file for complete search history.

(56) References Cited

U.S. PATENT DOCUMENTS

| 2,846,923 | A |   | 8/1958  | Tronnier              |
|-----------|---|---|---------|-----------------------|
| 5,321,554 | A | * | 6/1994  | Ishiyama et al. 359/753 |
| 5,434,704 | A |   | 7/1995  | Connors et al.        |
| 6,147,815 | A | * | 11/2000 | Fujie 359/742         |
| 2002/0048080 | A1 |   | 4/2002 | Nagatoshi et al.    |

FOREIGN PATENT DOCUMENTS

| DE | 1103616 B1 | 3/1961 |
| FR | 2032131 A  | 11/1970 |
| GB | 1388546 A  | 3/1975 |
| GB | 2141556 A  | 12/1984 |

* cited by examiner

*Primary Examiner*—Darryl J Collins
(74) *Attorney, Agent, or Firm*—Factor & Lake

(57) ABSTRACT

An objective for use in a night sight device has a front lens group and a rear lens group. The lenses of the front lens group have essentially equal diameters, whereas the lenses of the rear lens group have increasingly large diameters starting from the front end of the lens group.

19 Claims, 4 Drawing Sheets

Figure 3
Technical Data of the Objective according to Exemplary Embodiment 1

(R1 = radius of the front lens surface,
R2 radius of the rear lens surface)

| Lens | R1 (mm) | R2 (mm) | Thickness (mm) | Glass type | Diameter (mm) | Comment |
|---|---|---|---|---|---|---|
| L1 | 29.627 | 15.254 | 2.00 | ZnBaF6 | 9.6 | convex |
| L2 | 7.55 | 6.486 | 2.789 | ZnF7 | 9.6 | concave |
| L3 | 40.893 | 4.46 | 2.246 | ZnF7 | 10.3 | concave |
| L4 | 40.27 | 6.607 | 3.00 | ZnBaF6 | 10.3 | concave |
| L5 | 67.311 | 21.58 | 2.00 | ZnBaF6 | 13.0 | concave |
| L6 | 67.311 | 21.58 | 2.00 | ZnBaF6 | 14.5 | concave |

Figure 4
Technical Data of the Objective according to Exemplary Embodiment 2

(R1 = radius of the front lens surface,
R2 radius of the rear lens surface)

| Lens | R1 (mm) | R2 (mm) | Thickness (mm) | Glass type | Diameter (mm) | Comment |
|---|---|---|---|---|---|---|
| L1 | 115.5 | 9.954 | 3.18 | LaF1 | 9.5 | convex |
| L2a | 8.465 | 8.465 | 3.82 | LaF1 | 9.4 | convex |
| L2b | 8.465 | 7.383 | 3.22 | ZnF2 | 9.4 | concave |
| L3 | 15.58 | 4.504 | 2.88 | ZnF21 | 12.0 | concave |
| L4 | 15.58 | 7.77 | 3.18 | ZK11 | 12.0 | concave |
| L5 | 12.742 | 25.30 | 2.73 | LaF1 | 14.4 | concave |
| L6 | 223.4 | 33.725 | 2.73 | BaF2 | 16.2 | convex |

OBJECTIVE OPERATING IN THE INFRARED

RELATED APPLICATIONS

The present invention claims the benefit of the filing date of German Patent Application, Serial No. 10 2005 047 488.8, filed Oct. 4, 2005; the content of which is incorporated by reference herein.

TECHNICAL FIELD

The invention relates to an objective operating in the infrared, particularly for use in a night sight device.

BACKGROUND OF THE INVENTION

Night sight devices conventionally have an image transducer operating in the infrared, onto which an object to be observed is imaged by an objective. The objective has lenses which are transmissive in the infrared.

Night sight devices often have a heavy weight and are therefore unwieldy and difficult to handle.

SUMMARY OF THE INVENTION

It is an object of the present invention to provide an objective for a night sight device which is distinguished by a particularly light weight and good freedom from distortion, but which is capable of fully illuminating an IR image transducer.

In the objective according to the invention, an object-side or front lens group has smaller diameters then a rear or transducer-side lens group. The front lens group therefore has predominantly near-axis lens regions in which the distortions are small. Only in the rear lens group are lens regions having a larger distance from the objective axis also used, in order to fully illuminate the infrared image transducer.

BRIEF DESCRIPTION OF THE DRAWINGS

Embodiments of the invention are described in more detail hereinafter with the aid of the drawings, in which:

FIG. 3 shows technical data of the objective according to an exemplary embodiment of the present invention; and, FIG. 4 shows technical data of the objective according to another exemplary embodiment of the present invention.

DETAILED DESCRIPTION OF THE PRESENT INVENTION

Figure 1:
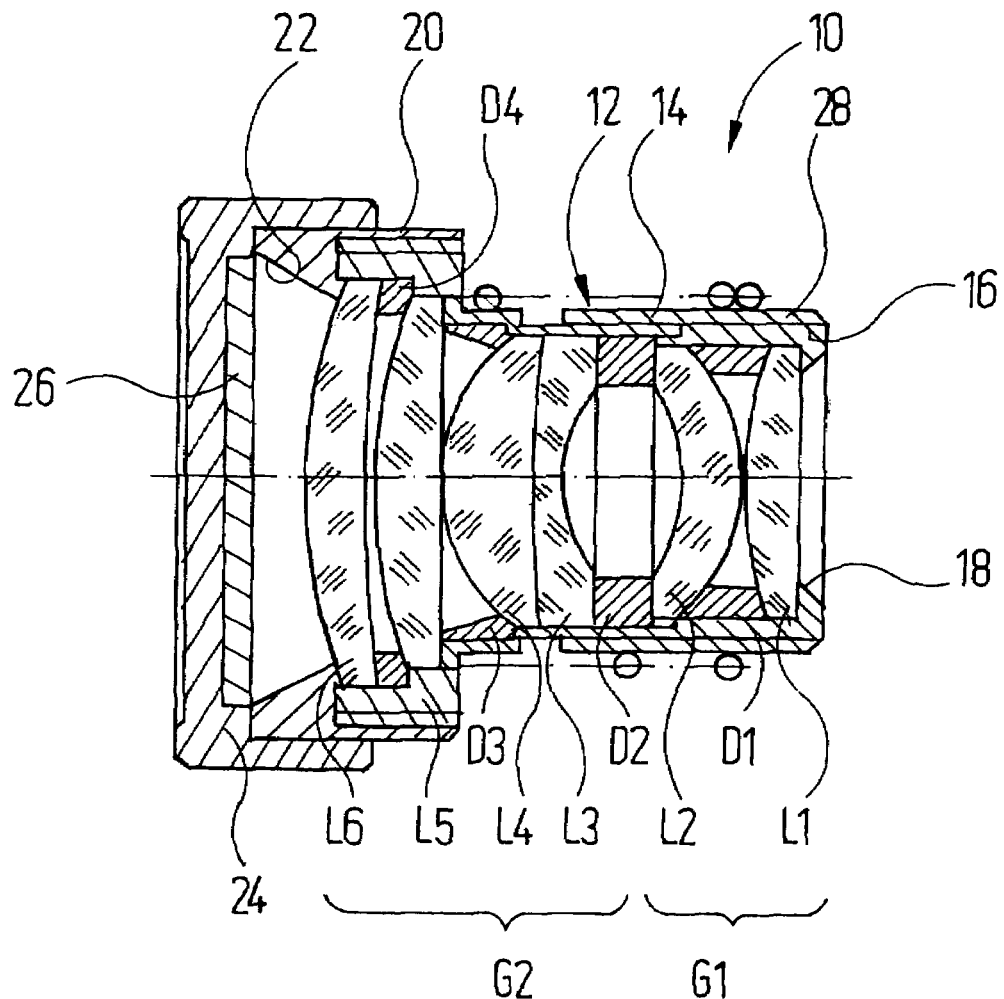
FIG. 1 shows an axial section through a first infrared night sight device with a six-lens objective.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Position specifications "front" and "rear" are used in the present description and the claims. These position specifications relate to an observer of the night sight device, who looks from the object side onto the objective and at the transducer lying behind the objective. The adjective "object-side" is sometimes used instead of "front" and the adjective "transducer-side" instead of "rear".

An objective, which comprises a housing 12 multiply stepped radially, is denoted overall by 10 in FIG. 1. The housing 12 has a multiply stepped sleeve part 14 which, on the object-side (lying on the right in FIG. 1) or front end, comprises a support flange 16 hooking radially inwards and having an entry window 18 with a conical bounding surface.

The sleeve end of the sleeve part 14 lying on the left in the drawing is provided with a screw thread. An end ring 10, which defines a likewise conical exit window 22, engages on this screw thread.

The rearwardly pointing terminal surface of the support flange 16 and the forwardly pointing terminal surface of the end ring 20 form positioning shoulders, between which two lens groups G1 and G2 are held axially in series without play.

The lens group G1 comprises a front lens L1, which is biconvex and made of ZnBaF6.

A second or rear lens L2 of the front lens group G1 is provided behind the lens L1, while being separated by a spacer ring D1. It is a convex/concave lens which is produced from ZnF7.

Between the front lens group G1 and the rear lens group G2, there is a spacer ring D2 which separates the two lens groups considerably. Its axial dimension amounts to approximately one third of its outer radius.

The second lens group G2 comprises a front lens L3, which is designed as a concave/convex lens. This lens is produced from ZnF7, and the radius of its front bounding surface is significantly greater than that of its only weakly curved rear bounding surface.

The rear bounding surface of the lens L3 is complementary to the front bounding surface of a further lens L4, which lies without separation on the rear side of the lens L3. The lens L4 is produced from ZnBaF6. Its rearward curvature is significantly greater than its front curvature.

Slightly separated from the lens L4 by a further spacer ring D3, there is a fifth lens L5 of the objective which has a weakly concave front bounding surface and a rear bounding surface curved more strongly in relation thereto. This lens is likewise produced from ZnBaF6.

A further lens L6, whose front bounding surface is weakly concave whereas its rear bounding surface is curved more strongly in relation thereto, is separated slightly from the lens L5 by a further spacer ring D4. The $6^{th}$ lens is similar or identical to the $5^{th}$ lens. The radii of curvature of the concave bounding surfaces lying on the right are identical to another, and the rear bounding surfaces lying on the left in the drawing are likewise identically curved.

Details regarding the radii of curvature of the various lens surfaces as well as the thickness of the various lenses, and the material from which they are made, are collated in FIG. 3.

The end ring 20 of the housing 12 is provided on its outer side with a screw thread which engages in an internal screw thread of a transducer housing 24. The transducer housing 14 holds an IR image transducer 26 which is connected via leads (not shown) to an operating circuit, via which it obtains the necessary operating voltages and via which it is read out continuously in order to produce a visible image of the received infrared image on a monitor (not represented in the drawing).

Figure 2:
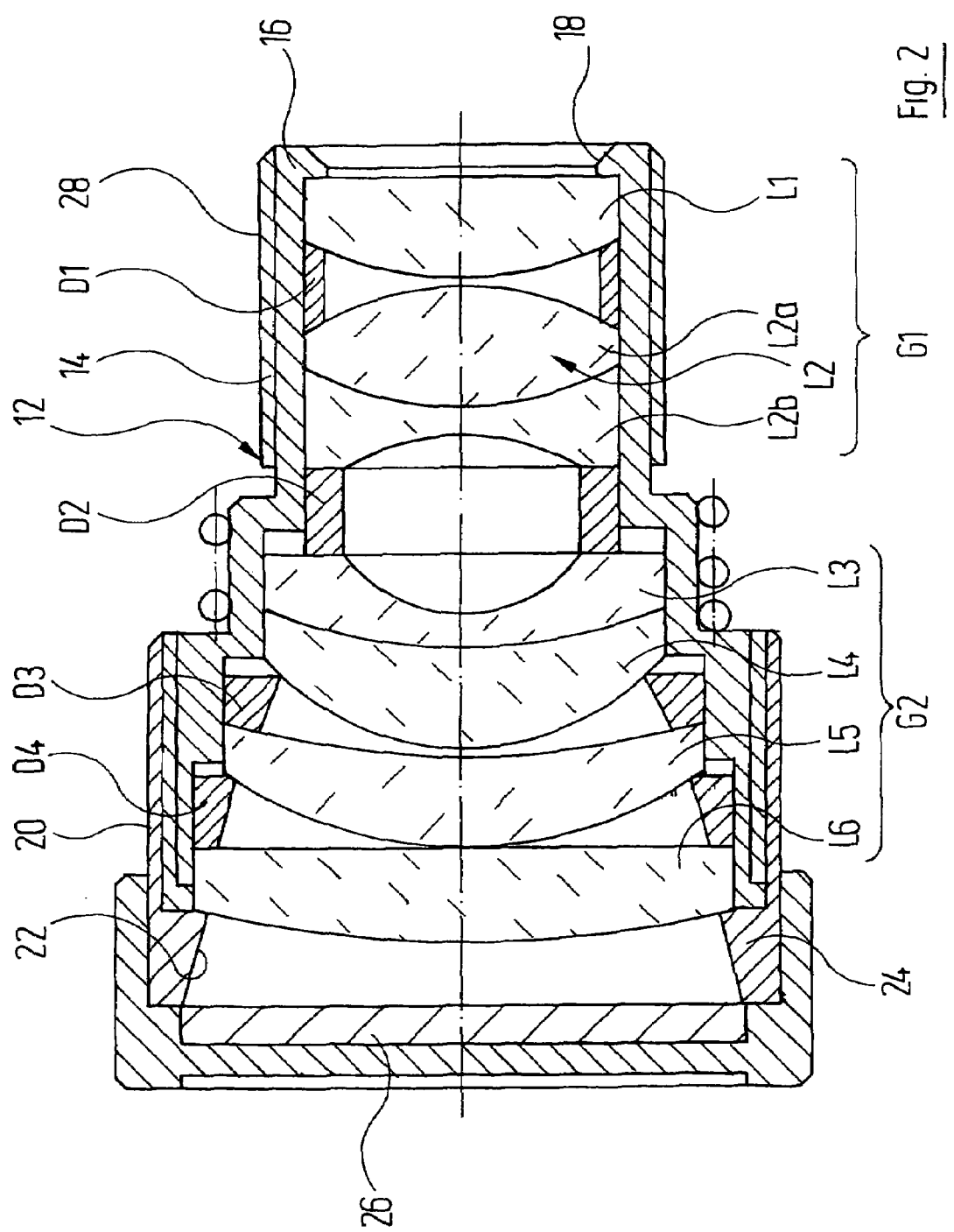
FIG. 2 shows a similar objective as FIG. 1, but in which a rear lens of the object-side lens group of the objective is formed by two individual lenses, which bear on one another via complementary bounding surfaces.

The exemplary embodiment according to FIG. 2 is shown on a different scale from that according to FIG. 1. The size proportions are in reality essentially similar, as shown in detail by the dimensions specified in FIG. 4.

The main difference of the objective according to FIG. 2 from that according to FIG. 1 is as follows:

The rear lens L2 of the object-side lens group G1 is formed by two lenses L2a and L2b, which bear on one another via complementary bounding surfaces. The lens L2a is a biconvex lens, whereas the lens L2b is a biconcave lens.

The outer bounding surfaces of the lens L2, however, are again roughly concentric as in the exemplary embodiment according to FIG. 1.

The sleeve part 14, the end ring 20 and the transducer housing 24 are plastic injection-moulded parts or metal parts in both exemplary embodiments. The same is true of the spacer rings D. The materials, from which the individual lenses are made, are reported in FIGS. 3 and 4.

The outer side of the sleeve part 14 may carry an external screw thread 28, as schematically indicated in the figures, in order to fasten the entire unit comprising the objective and the image transducer on a portable holder.

It should be emphasized that the above-described embodiments of the present invention, particularly, any "preferred" embodiments, are possible examples of implementations merely set forth for a clear understanding of the principles of the invention. Many variations and modifications may be made to the above-described embodiments of the invention without substantially departing from the spirit and principles of the invention. All such modifications are intended to be included herein within the scope of this disclosure and the present invention, and protected by the following claims.

TABLE 1

Technical Data of the Objective according to Claim 12
(R1 = radius of the front lens surface, R2 radius of the rear lens surface)

| Lens | R1 (mm) | R2 (mm) | Thickness (mm) | Glass type | Diameter (mm) | Comment |
|---|---|---|---|---|---|---|
| L1 | 29.627 | 15.254 | 2.00 | ZnBaF6 | 9.6 | convex |
| L2 | 7.55 | 6.486 | 2.789 | ZnF7 | 9.6 | concave |
| L3 | 40.893 | 4.46 | 2.246 | ZnF7 | 10.3 | concave |
| L4 | 40.27 | 6.607 | 3.00 | ZnBaF6 | 10.3 | concave |
| L5 | 67.311 | 21.58 | 2.00 | ZnBaF6 | 13.0 | concave |
| L6 | 67.311 | 21.58 | 2.00 | ZnBaF6 | 14.5 | concave |

TABLE 2

Technical Data of the Objective according to Claim 14
(R1 = radius of the front lens surface, R2 radius of the rear lens surface)

| Lens | R1 (mm) | R2 (mm) | Thickness (mm) | Glass type | Diameter (mm) | Comment |
|---|---|---|---|---|---|---|
| L1 | 115.5 | 9.954 | 3.18 | LaF1 | 9.5 | convex |
| L2a | 8.465 | 8.465 | 3.82 | LaF1 | 9.4 | convex |
| L2b | 8.465 | 7.383 | 3.22 | ZnF2 | 9.4 | concave |
| L3 | 15.58 | 4.504 | 2.88 | ZnF21 | 12.0 | concave |
| L4 | 15.58 | 7.77 | 3.18 | ZK11 | 12.0 | concave |
| L5 | 12.742 | 25.30 | 2.73 | LaF1 | 14.4 | concave |
| L6 | 223.4 | 33.725 | 2.73 | BaF2 | 16.2 | convex |

What is claimed is:

1. An objective operating in the infrared having a front lens group and a rear lens group, wherein:
the diameter of the lenses of the rear lens group increases continuously in the rearward direction; and,
the two lens groups are separated from one other by a predetermined distance, whereas the lenses lying within the lens groups follow one another essentially without any separation.

2. The objective according to claim 1, wherein the rear bounding surface of a rearmost lens of the front lens group and the front bounding surface of a foremost lens of the rear lens group are both concave.

3. The objective according to claim 1, wherein the radius of the rear bounding surface of the rearmost lens of the front lens group is approximately 1.5 to 3 times as great as the radius of the front bounding surface of the foremost lens of the rear lens group.

4. The objective according to claim 1, wherein a first lens and a second lens of the rear lens group have a complementarily equal radius and bear on one other.

5. The objective according to claim 1, wherein a first lens and a second lens of the second lens group together form a diverging lens.

6. The objective according to claim 1, wherein a third lens of the rear lens group has a concave front bounding surface and a convex rear bounding surface curved more strongly in relation thereto.

7. The objective according to claim 1, wherein a fourth lens of the rear lens group has a concave front bounding surface and a convex rear bounding surface curved more strongly than the latter.

8. The objective according to claim 1, wherein a first lens of the front lens group has a convex front bounding surface and a convex rear bounding surface, the radius of the front bounding surface being 1.5 to 3 times the radius of the rear bounding surface.

9. The objective according to claim 1, wherein a second lens of the front lens group is formed by two lenses which bear on one another via complementary bounding surfaces.

10. The objective according to claim 1, wherein the lenses consist of ZnBaF6 or ZnF7.

11. The objective according to claim 10, wherein the lens groups comprise lenses whose geometry and materials are selected according to the appended Table 1.

12. The objective according to claim 1, wherein the lenses include LaF1, ZnF2, ZFK11, or BaF2.

13. The objective according to claim 12, wherein the two lens groups comprise lenses whose geometry and materials are selected according to the appended Table 2.

14. The objective according to claim 1, wherein spacer rings, by which the lenses of the rear lens group are axially positioned, have frustoconical inner surfaces.

15. The objective according to claim 14, wherein the frustoconical inner surfaces of the spacer rings essentially define a common cone surface.

16. The objective according to claim 1, wherein the lenses of the two lens groups are fitted from the rear into a sleeve-shaped housing, which is closed by an end ring at the rear end.

17. The objective according to claim 1, wherein a housing is connected at the rear end to a transducer housing.

18. The objective according to claim 17, wherein the housing is releasably connected at the rear end to the transducer housing.

19. The objective according to claim 17, wherein the housing is screwed at the rear end to the transducer housing.

* * * * *